United States Patent [19]

Cleworth

[11] Patent Number: 4,964,472

[45] Date of Patent: Oct. 23, 1990

[54] WEED REMOVER

[76] Inventor: Marianne Cleworth, 455 Poppy Hill Rd., Watsonville (Corralitos), Calif. 95076

[21] Appl. No.: 462,887

[22] Filed: Jan. 3, 1990

Related U.S. Application Data

[63] Continuation-in-part of Ser. No. 307,542, Mar. 23, 1989, abandoned.

[51] Int. Cl.⁵ ............................................. A01B 1/16
[52] U.S. Cl. ........................................ 171/11; 172/41; 172/370; 111/7.2; 56/12.9; 56/239
[58] Field of Search .................... 172/41, 33, 35, 438, 172/370, 371, 329; 171/11, 62, 144; 111/7.1, 7.2, 7.3, 7.4; 47/1.5, 1.7; 15/300 R, 320; 56/12.8, 12.9, 13.1, 16.8, 239; 43/139

[56] References Cited

U.S. PATENT DOCUMENTS

| | | | |
|---|---|---|---|
| 947,906 | 2/1910 | Hall | 111/7.3 |
| 1,054,485 | 2/1913 | Archard | 111/7.2 |
| 1,812,427 | 6/1931 | Bergmann | 111/7.4 |
| 2,217,109 | 10/1940 | Gillmor | 111/7.4 |
| 2,629,218 | 2/1953 | Smith | 56/12.9 X |
| 3,430,421 | 3/1969 | Matthews | 56/16.9 X |
| 3,857,515 | 12/1974 | Zennie | 56/16.8 X |
| 3,905,181 | 9/1975 | Messner | 56/13.1 |
| 4,780,986 | 11/1988 | Broomfield | 43/139 |

FOREIGN PATENT DOCUMENTS 2082432  3/1982  United Kingdom .................. 172/41

OTHER PUBLICATIONS

"Homelite Gas Blower w/Vac", Hechinger Co. Advertising Supplement, Washington Post, Oct. 1989.

*Primary Examiner*—Randolph A. Reese
*Assistant Examiner*—Jeffrey L. Thompson
*Attorney, Agent, or Firm*—Jeffrey A. Hall

[57] ABSTRACT

A weed remover (14) for eradicating, killing, collecting and dispensing weeds without the user having to touch the soil or weeds comprises a frame (22), a handle (16), a foot bar (34), a digging blade (36), a vacuum inlet tube (40), a vacuum blower (86), an outlet hose (94), and a weed collecting housing (48) secured to frame (22). A weed disposal bag (44) is secured to the weed collecting housing (48) and tubes (40, 42) provide a track for weeds to be sucked into a disposable weed bag (44) by vacuum generated from an electric motor (28). A battery charger (100) is provided as well as a tank (26) for weed killer or other fluids and delivery tubing is provided (50, 58, 150) for delivering the weed killer to soil near the severed weed root.

14 Claims, 11 Drawing Sheets

WEED REMOVER

This is a continuation-in-part of Ser. No. 07/307,542, filed Mar. 23, 1989, now abandoned.

BACKGROUND OF THE INVENTION

1. Field of Invention

This invention relates generally to weed removers, and specifically to weed removers having automated suction apparatus for the removal and collection of yard and garden weeds, and for performing a wide variety of other functions.

2. Description of Prior Art

Many, if not most homeowners and gardeners would prefer a weed removal apparatus to assist in the removal, collection, and disposal of weeds commonly encountered in gardening and maintenance activities. Ideally, such an apparatus would be operable from an upright position and require a minimum of exertion and inconvenience to the user. It would further have means to detach the weeds at their roots and be operable in a quick and efficient manner.

Traditionally, weed removal has been accomplished by the use of hoes, shovels, trowels, and other conventional tools, or by simply attempting to pull the weeds up by hand. These methods tend to be laborious, dirty, and physically exhausting if performed over any period of time.

Various attempts have been made in the prior art to overcome these problems, all with significant limitations and applicability. For example, U.S. Pat. No. 1,812,427 issued to Bergmann discloses a weed apparatus having an elongated handle, cylindrical reservoir, poison delivery apparatus, blade, and a plunger connected to a compression spring. In operation, the blade was pressed against the root of the weed, pressure by the foot then causes the blade to cut the weed and a small amount of poison is then delivered to the root. This apparatus was severely limited in application due to the necessity of pinpointing the exact location of the severed root and the delivery of poison thereto. Furthermore, such device was cumbersome and inefficient in operation, and basically unusable for small weeds without large targetable root systems.

Another illustration of weed removal apparatuses in the prior art is U.S. Pat. No. 2,217,109 issued to Gilmore. This apparatus comprised a digging blade, an aligning footpiece, and a collection bag. The bag was used to dispense a liquid weed killer or oil. A suction was created by movement of a cylinder below a piston to facilitate removal of the weed. This apparatus was greatly limited both in function and spectrum of use. The foot operated vacuum provided sufficient strength for removal of only the smallest of weeds. Additional limitations were that no means were provided for automated vacuum force, nor were adequate collection and dispersal means provided by this apparatus.

Most users, therefore, would find it desirable to have a tool for completely removing landscaping weeds without the user having to touch the soil or the weeds, and further having automatic vacuum means and provision for the convenient removal, collection, and dispersal of the weeds.

SUMMARY OF THE INVENTION

Accordingly, I claim the following as the objects and advantages of the invention: to provide a weed removal apparatus for easily, reliably, and neatly removing, collecting, and dispersing weeds regardless of their size; to provide an apparatus having automated suction means for facilitating removal and collection of targeted weeds; to provide an apparatus operable from a standing position with finger control of cutting and suction functions so that the users' hands and fingernails stay clean and uninjured during operation; to provide an apparatus having a sharp digging blade as well as a horizontal footpiece useful to align and apply pressure to help penetrate the soil and sever the weed root; and to provide such an apparatus which is extremely lightweight, allowing for onehanded control.

In addition I claim the following objects and advantages: to provide a weed remover having a weed collection and disposal bag; to provide a weed remover which may be carried by means of a shoulder strap, to provide a weed remover having a poison delivery system so that poison may be applied to the severed and branching roots of a weed; to provide a weed remover that is adjustable, lightweight, and extremely efficient; and to provide such a weed remover useful on all sizes and types of weeds.

These objects and advantages of my invention are achieved by a weed remover having a frame, a handle; a pair of foot bars, a digging blade, a vacuum inlet tube, a vacuum blower, an outlet hose, a weed collecting housing, a weed disposal bag, a battery powered electric motor and battery recharging means, and a weed killer or poison tank and delivery system.

This invention further provides a weed remover operable from a standing position, having vacuum components and trigger operated poison or weed killer dispensing unit, with a collecting bag to form an efficient and easy way to use the weed remover with automatic suction apparatus for the removal, collection, and dispersal of garden weeds.

Readers will find further objects and advantages from a consideration of the ensuing description and the accompanying drawings.

BRIEF DESCRIPTION OF THE DRAWINGS

FIG. 22 shows a perspective view of 202, 204, and 206 according to the invention. Drawing Reference Numerals:
14: Weed Remover
16: Handle
18: Trigger Valve (dispense weed killer)
20: Trigger Switch (blower motor)
22: Frame
24: Cover (weed killer liquid tank)
26: Tank (weed killer)
28: Electric Motor
30: Drive Belt
32: Battery Pack
34: Foot Bar
36: Blade, Weed Cutting
38: Hinge, Weed Lifting
40: Input Tube
42: Output Tube
44: Disposable Bag
46: Shoulder Strap
48: Housing, Weed Collecting
50: Tubing
52: Blade Tip
54: Fastener
56: Pinch Lever Tip
58: Flexible Tubing
60: Blower Rotor
62: Cover-Spacer
64: Upper Blower Housing
66: Lower Blower Housing
68: Drive Pulley
70: Motor Shaft
72: Ball Bearing Element
74: Threaded Fastener
76: Baffle
78: Air Outlet Opening
80: Strap Attaching Means
82: Motor Attachment Means
84: Fan Blade
86: Inside Diametral Surface, Blower Rotor
88: Groove (race for ball bearing)
90: Angled Tip (moveable element) of Hinge
92: Blade Support
94: Outlet Hose
96: Input End of 40
98: Housing Cover, Left
100: Charger Unit
102: Charging Connector, female
104: Charging Connector, female
106: Charging Connector Housing
108: Contoured Surface to fit 22
110: Groove for Ball Bearing Element
112: Fastener Nut
114: Fastener Screw
116: Ball Bearing Race Insert
118: Ball Bearing Race Insert
120: Mounting Backplate
122: Support Rod
124: Charging Connector
126: Charging Connector
128: Pivoting End of Lever
130: Pivot Pin for 18 and 20
132: Wall Plug
134: Weld
136: Connecting Rod
138: Flexible Tubing
140: Flexible Ring
142: Battery Attachment Means
144: Tank Attachment Means
146: Open End of 50
148: Weed Killer Fluid
150: Tubing
152: Cutting Area of Blade 36
154: Fastener to hold Housing Cover 98
156: Weed Body
158: Weed Root
160: Tooth on Belt 30
162: Tooth on Pulley 68
164: Electrical Components
166: Weed Dispensing Components
168: Seal
170: Housing Cover, right side
172: Top Surface of 122
174: Bottom Surface of 16
176: Filler Block
178: Dowel Pin
180: Threaded Hole for 74
182: Slip-fit Hole for 174
184: Press-fit Hole for 174
186: Precision Spacer
188: Slip-fit Hole for 192
190: Major Dia. of 186
192: Minor Dia. of 186
194: Threaded End of 186
196: Hex Nut
198: Lock Washer
199: Pivot Point
200: Pivot Point
202: Tension Spring
204: Lever
206: Anchor Pin
208: Support Gusset Pad for supporting 40
210: Angled End of Lever Rod 204

DETAILED DESCRIPTION OF A PREFERRED EMBODIMENT

Figure 1:
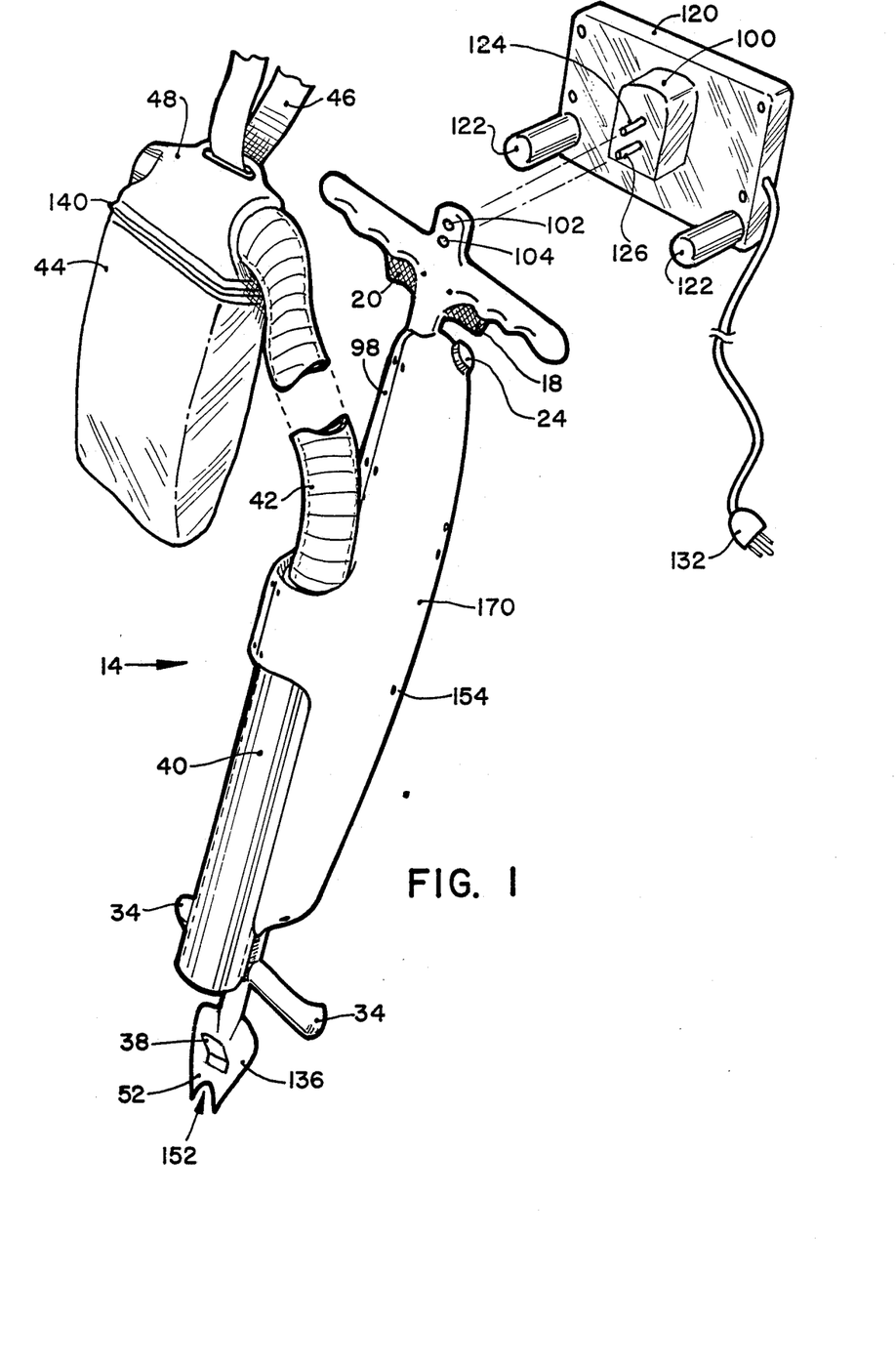
FIG. 1 shows a perspective view of the weed remover according to the invention.
Figure 2:
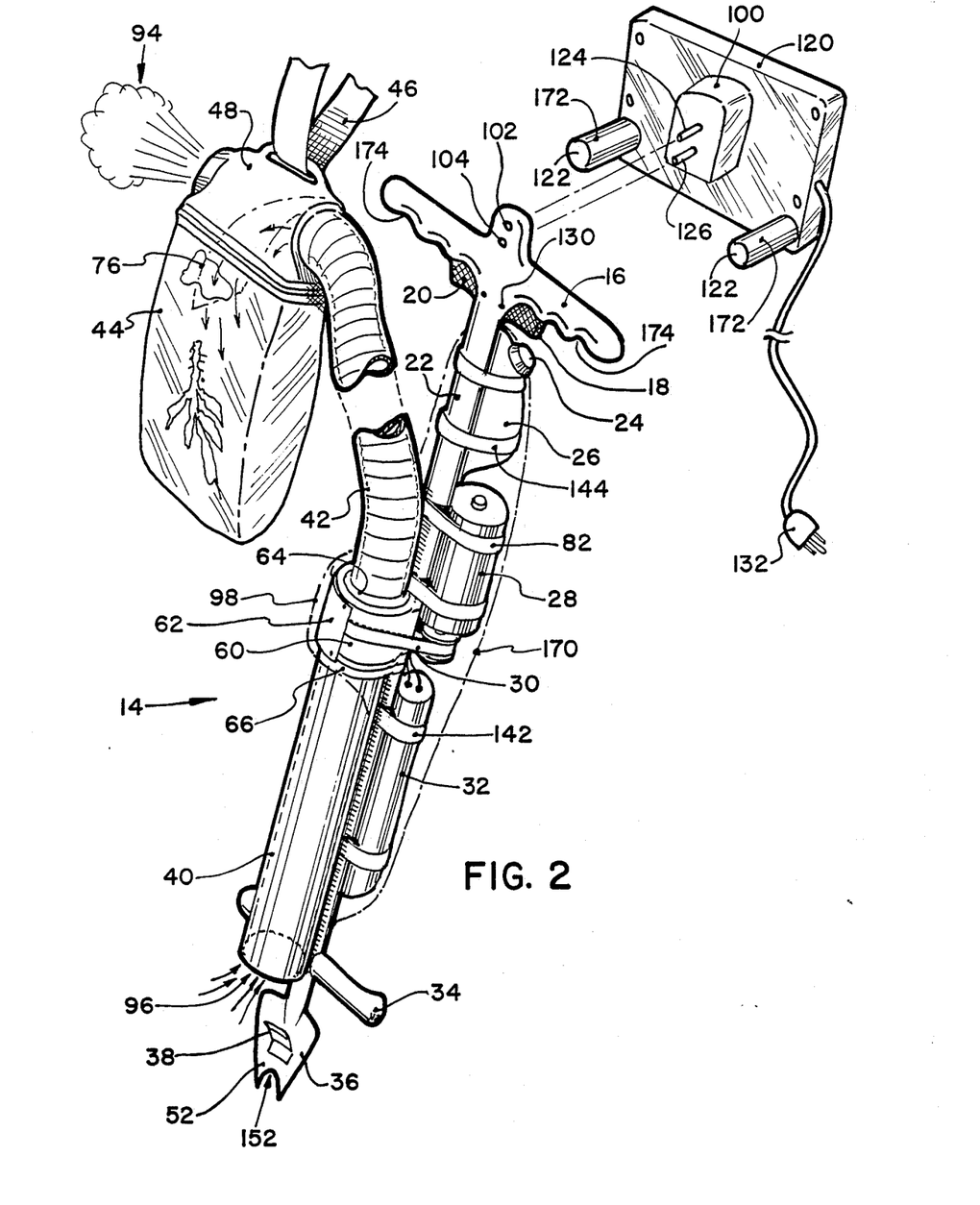
FIG. 2 shows a perspective view of the weed remover with body covering removed.
Figures 3, 4:
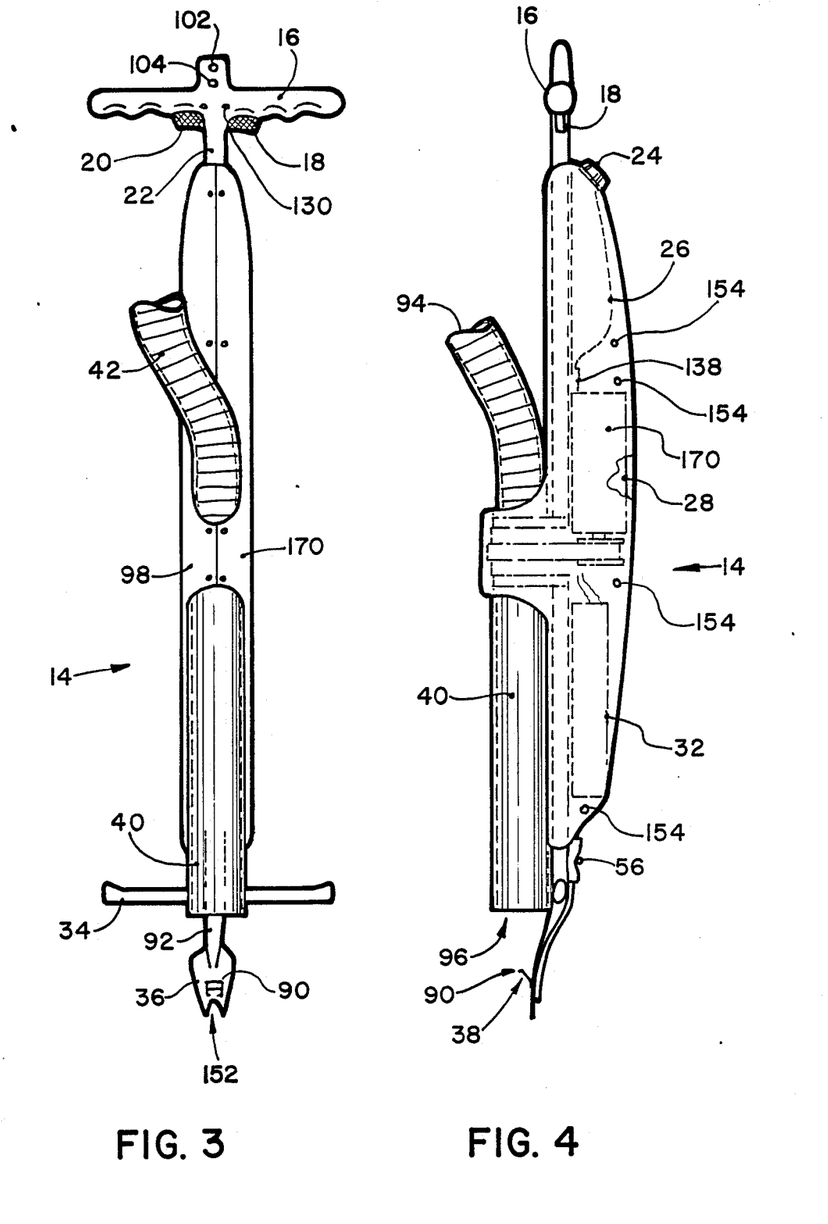
FIG. 3 shows an orthographic front view of such weed remover.
FIG. 4 shows an orthographic side view of such a weed remover.

FIG. 1 shows a weed remover according to the preferred embodiment of the invention. FIGS. 1—22 show various details of such a weed remover. The weed remover 14 generally comprises a frame 22, a handle 16, foot bars 34, a digging blade 36 which may be equipped with a weed lifting hinge 38, a vacuum inlet tube 40, a vacuum blower 86, an outlet hose 94, a weed collecting housing 48, a weed disposal bag 44, a battery powered electric motor 28, a plurality of batteries, and recharging means for the batteries.

In the preferred embodiment weed remover 14 further includes a trigger switch 20 which activates an electric motor 28 thereby driving a toothed belt 30 by means of a pulley 68. Belt 30 causes blower rotor 60 to spin by frictional driving of teeth 160 on belt 30.

In the preferred embodiment rotor 60 is free to rotate on ball bearings 72 together with inserted metal races 116 and 118. These races 116 and 118 are retained by housings 64 and 66. A cover-spacer 62 may be used to control the spacing of housings 64 and 66 using dowel pins 178 adapted to fit within holes 182 and 184.

Cover 62 is held in position by screws 74, however, rivets or other conventional fastening means may be used. A precision spacer 186 is used to control the spacing of housings 64 and 66 by insertion of spacer 186 between housings 64 and 66 in holes 188 located in housings 64 and 66. A plurality of lock washers 198 and a plurality of hex nuts 196 are assembled into threaded ends 194 and secure housings 64 and 66 against spacer 186. Fasteners 114 together with hex nuts 112 secure housings 64 and 66 to the frame 22.

The housing 66 also acts to support an input tube 40 at one end, while rivet 54 holds the opposite end securely against a plurality of support gussets 208. An output tube 42 is supported by housing 64 and is secured to housing 48 at an outlet side of tube 42.

Weeds 156 that are sucked into weed remover 14 are deflected by a baffle 76 inside housing 48 to the bottom of a disposal bag 44 while air flow 94 exits upward and out of housing 48 through a plurality of exhaust holes 78.

To assist in carrying and positioning weed remover 14 a shoulder strap 48 is attached to housing 48 which also supports a disposable bag 44 by way of a flexible ring 140. Alternative embodiments may, of course, be made having non-disposable bag and fixed rings or combinations thereof.

Weed remover 14 is also provided with a tank 26 for holding weed killer 148 poison, or other fluids. Trigger 18 when squeezed allows weed killer 148 to flow from tank 28 to tubing 138 and then to tubing 150. From tubing 150 the weed killer 148 flows through a flexible tubing 58 to tubing 50 and through an opening 146 to the area of the ground in which the lateral or smaller branching roots of weed 158 remain. Tank 26 is filled with weed killing fluid 148 through an opening in tank 26 held closed by tank cover top 24. Tubing 50 is secured to blade 36 by means of metal welds 134 in the preferred embodiment. Blade 36 may be used to cut or dig up weeds and weed roots concurrently with the delivery of poison through tube 50.

Figures 5, 6:
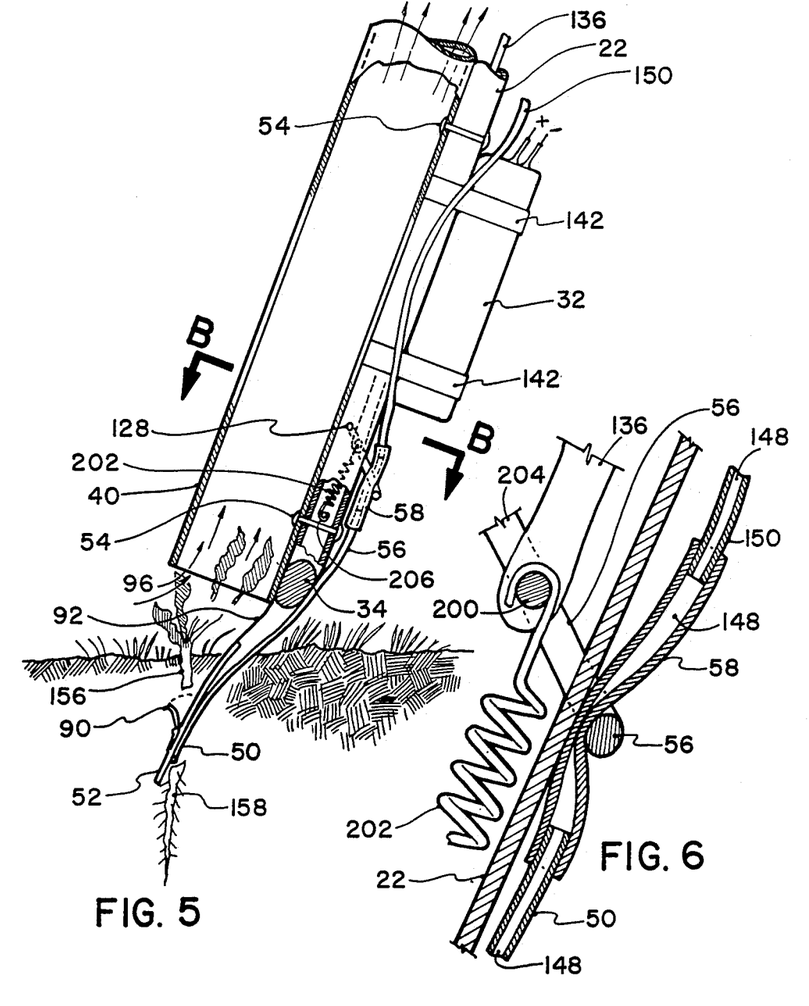
FIG. 5 shows a cutaway view of the lower end of such a weed remover showing weed cutting.
FIG. 6 shows a sectional view of a pinch valve assembly of such a weed remover for dispensing weed killer fluid.
Figure 7:
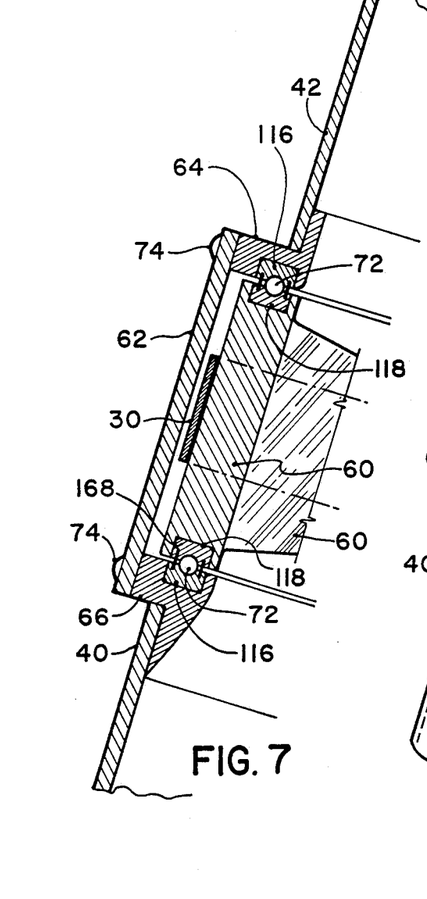
FIG. 7 shows an exploded partial section of the blower rotor, housing bearings, drive belt, and input and output tube of such weed remover.
Figure 8:
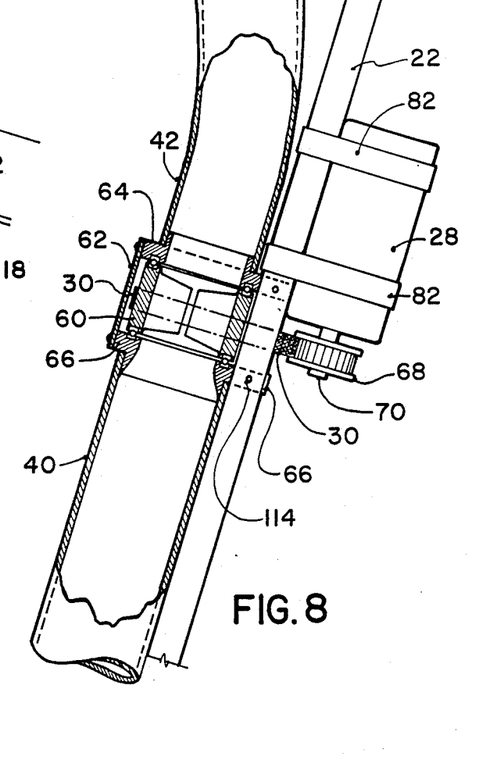
FIG. 8 shows a sectional view of the blower assembly, frame, and motor drive of such weed remover.
Figure 20:
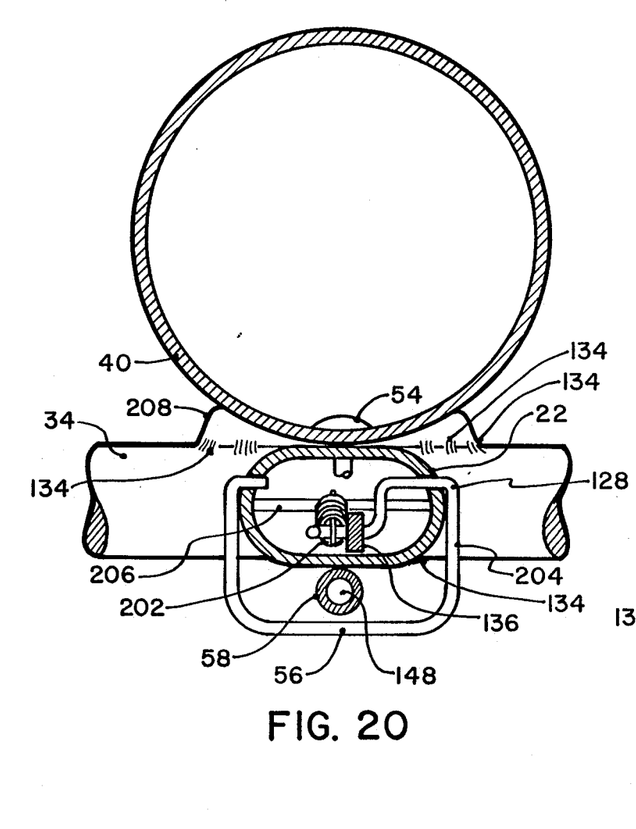
FIG. 20 shows section B—B, with the pinch valve open of such weed remover.
Figure 21:
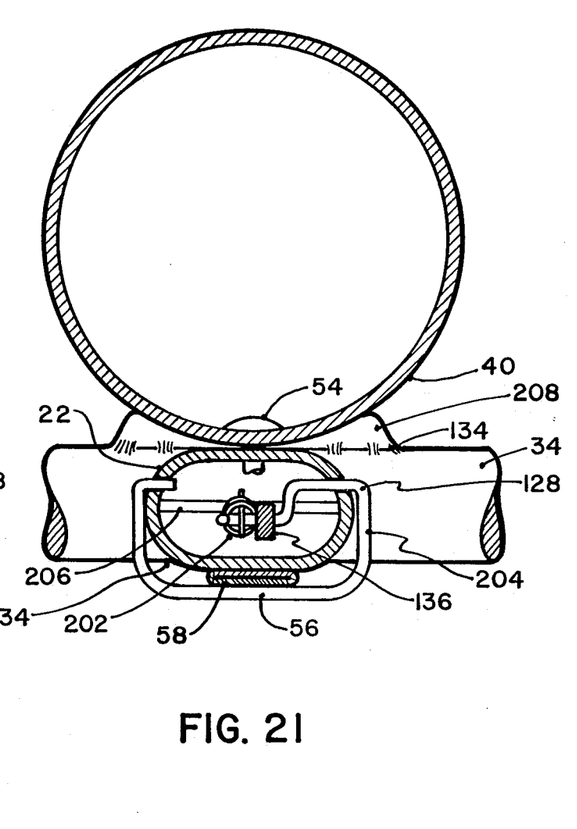
FIG. 21 shows a sectional view through B—B with the pinch valve shown closed of such weed remover.
Figure 22:
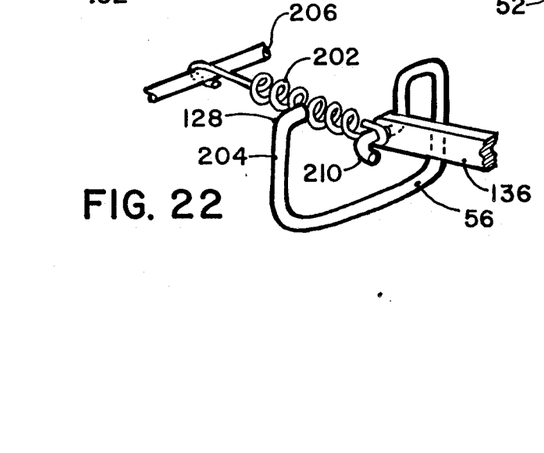

Weeds are cut by a sharp edge 52 on the arc 152 of blade 36. A blade support 92 connects blade 36 to a frame 22 in a continuous transition of metal in the preferred embodiment. A hinge 38 is mounted to blade 36 by way of a welded hinge 134 element which acts as a pivoting barb flap to enable lifting of weeds 156 from the ground. An angled tip 90, of hinge 38 causes hinge 38 to pivot outward when the unit 14 is raised vertically after first entering the ground, thereby cutting the weed. A pinch valve assembly shown in FIG. 6 is comprised of tubing 58, lever 204, connecting rod 136, spring 202, and anchor pin 206. FIG. 20 shows the pinch valve assembly in the open position and FIG. 21 shows it in a closed position. Trigger 18 is provided so that when it is squeezed it causes connecting rod 136 to pull lever 204 away from tubing 58 allowing weed killer 148 to flow. A spring 202 causes lever 204 to pivot back against tubing 58 when trigger 18 is released. Pinch lever tip 56 of lever 204 presses against tubing 58. The pivoting end 128 of lever 204 is the point about which lever 204 is rotated by approximately 30° total movement.

Figures 9, 18:
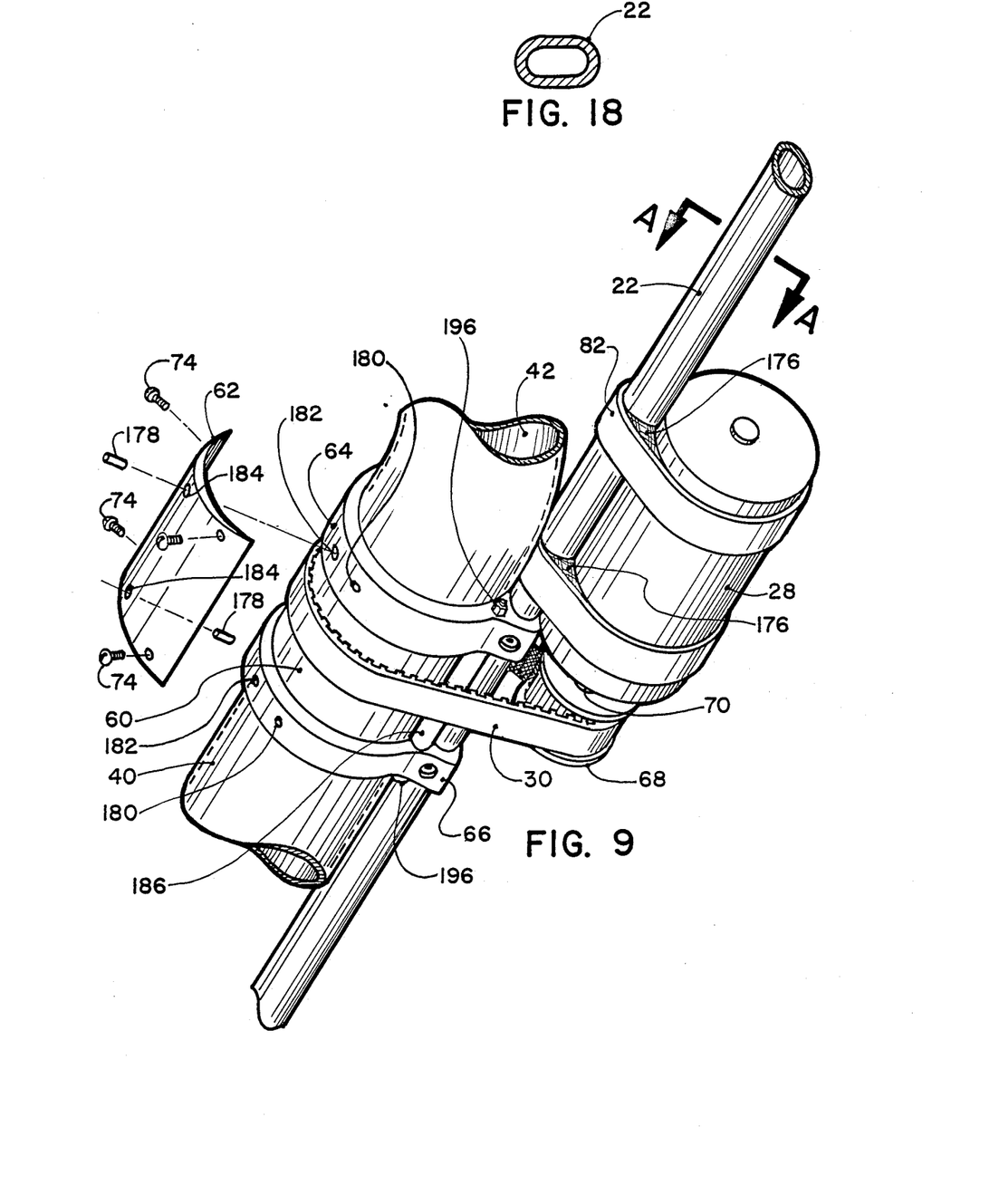
FIG. 9 shows a perspective view of the blower and drive assembly frame of such, weed remover.
FIG. 18 shows a sectional view of the frame tubing through A—A.
Figure 10:
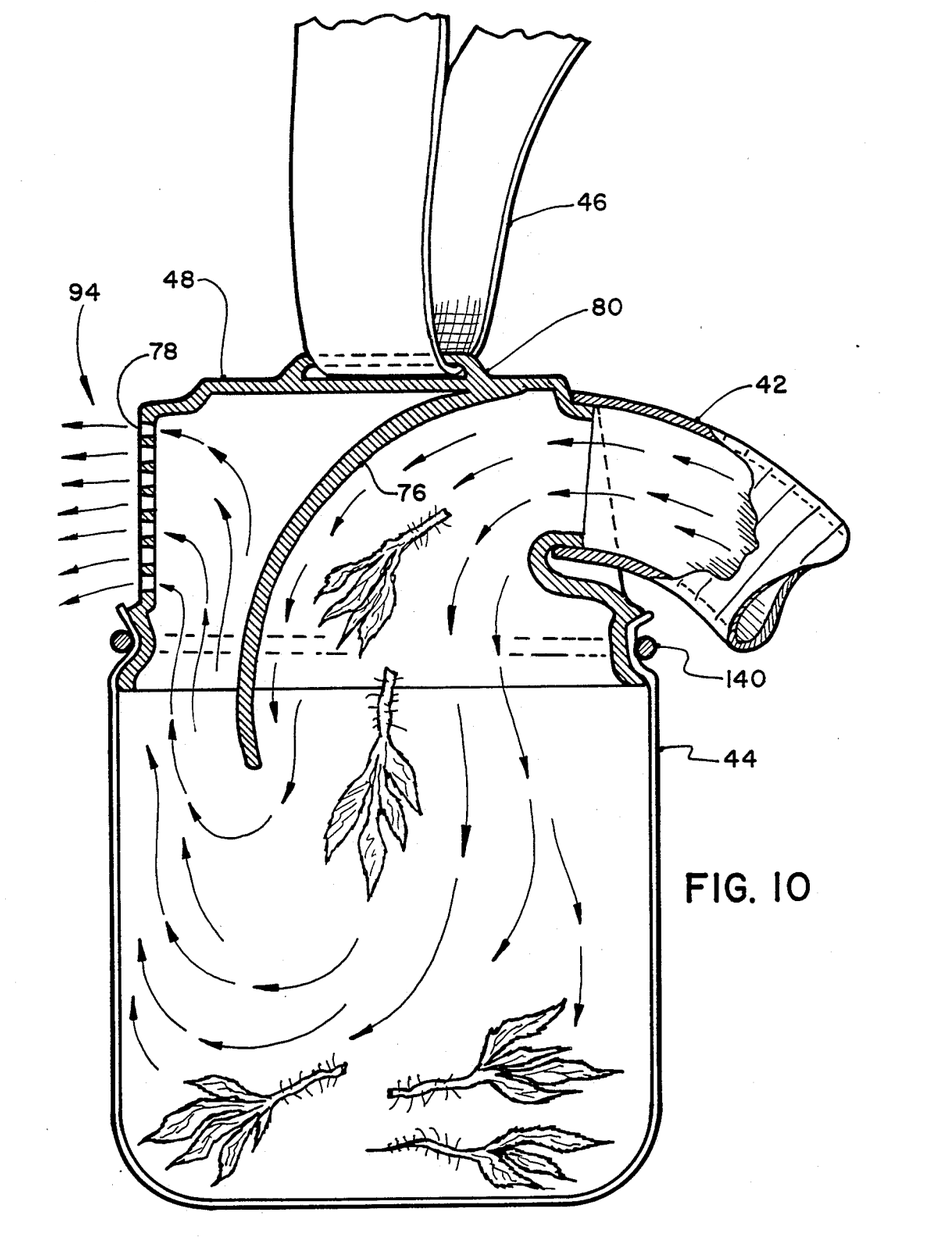
FIG. 10 shows a sectional view of the weed collecting housing, disposal bag, and elastic retaining ring of such weed remover.
Figures 11, 12, 13, 19:
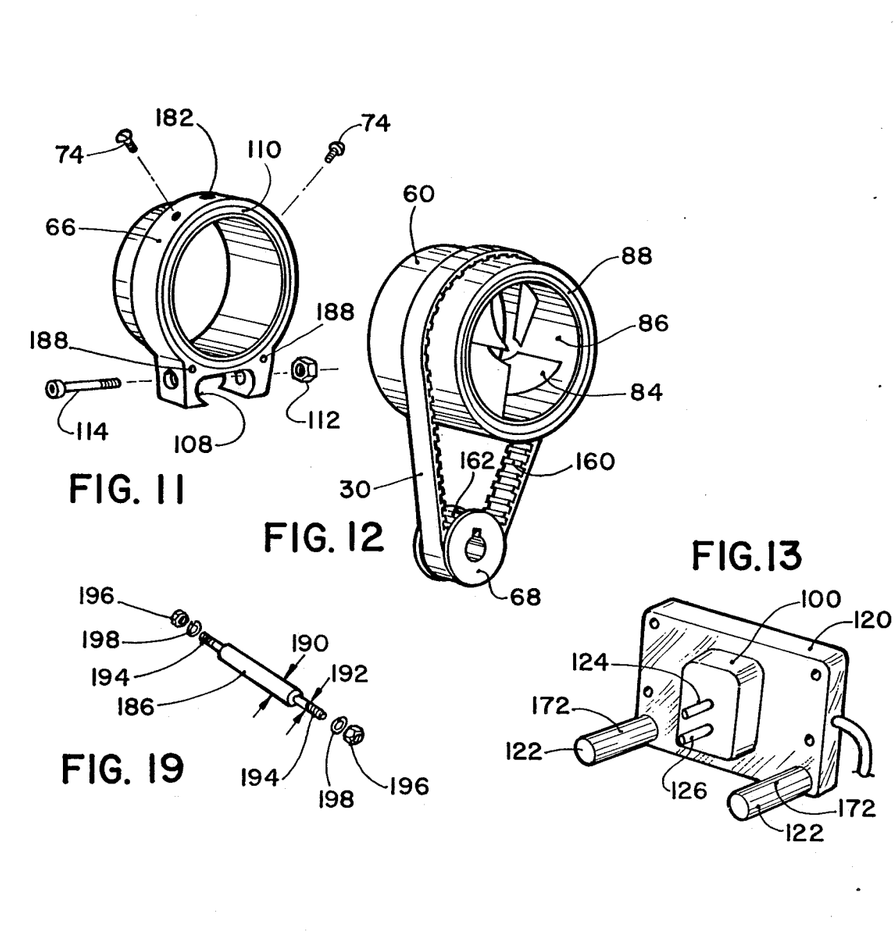
FIG. 11 shows a perspective view of the lower blower housing of such weed remover.
FIG. 12 shows a perspective view of the blower rotor, drive belt, and drive pully of such weed remover.
FIG. 13 shows a perspective view of the wall-mounted battery charger assembly of such weed remover.
FIG. 19 shows a perspective view of 186, 198 and 196.
Figure 14:
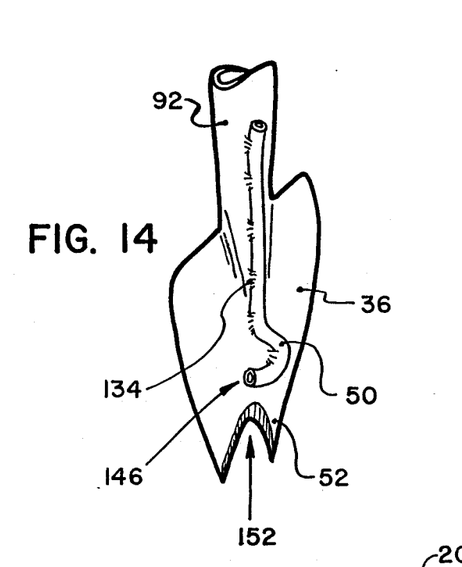
FIG. 14 shows a perspective rear view of the weed remover blade and end portion of the weed killer dispensing tube of such weed remover.
Figure 15:
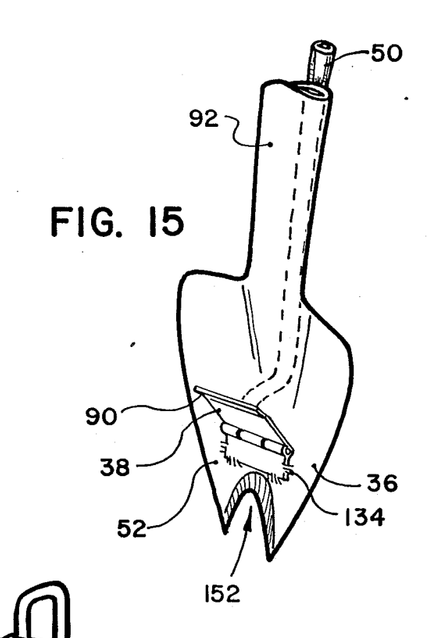
FIG. 15 shows a front perspective view of the weed remover blade showing detail of the hinged weed lifter of such weed remover.
Figure 16:
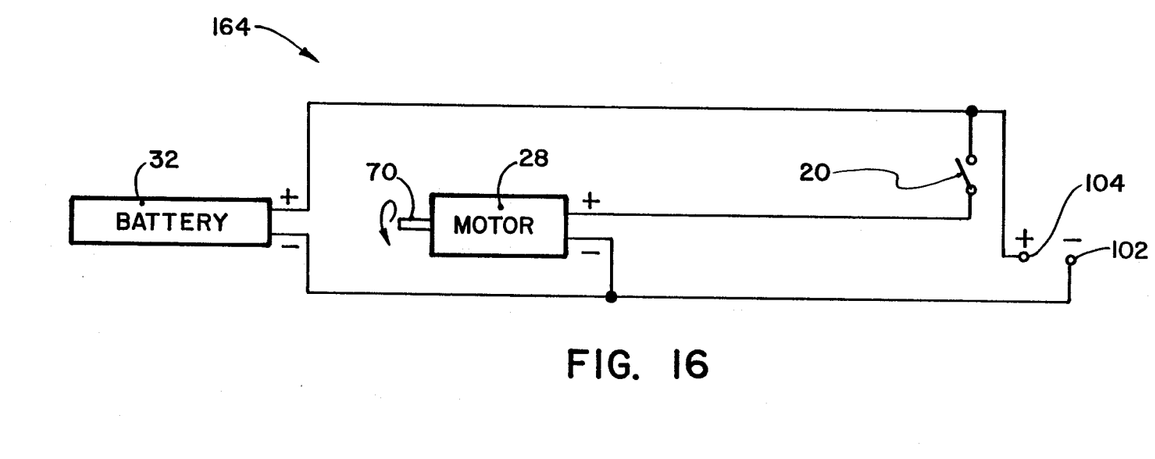
FIG. 16 shows a schematic diagram of the electric circuit of such weed remover.
Figure 17:
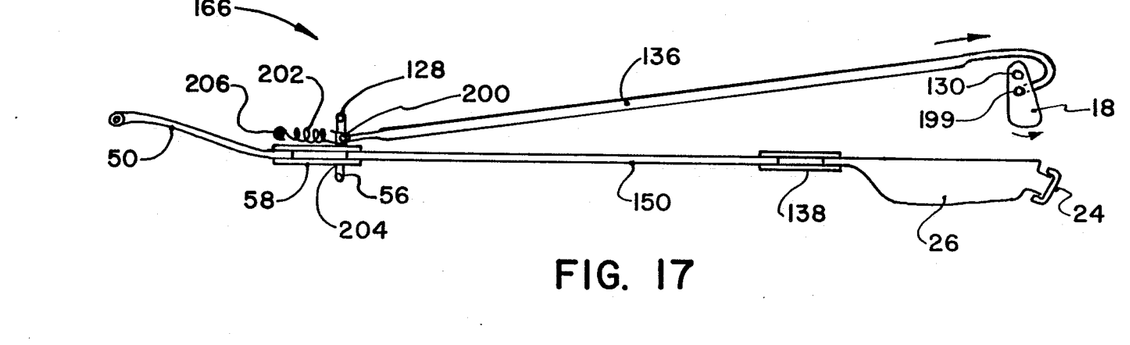
FIG. 17 shows a schematic diagram of the weed killer dispensing means of such weed remover.

A battery pack 32 is secured to the frame 22 by means of metal straps 142. Motor 28 is secured in position against the frame 22 by way of metal straps 82, with a plurality of filler blocks. FIG. 18 shows the cross section A—A of frame 22.

A removable charger unit 100, is mounted on a back plate 120, secured to a wall and powered by electricity via plug 132 through a power cord. Male electrical contacts 124 and 126 supply power to female contacts 102 and 104 only when the handles 16 are resting on surfaces 172 of the charger unit. Conventional proximity switches inside elements 122 sense the presence of handles 16 and allow current to flow to the batteries 32. Removing the unit 14 from the wall charger shuts off the charging current by sensing of proximity switches which indicate no presence of handles 16 upon surfaces 172. Elements 122 are hollow inside and allow placement of proximity switches inside.

In the preferred embodiment rotor 60 has no shaft to block passage of weeds through the rotor. Blades 84 when rotating force air to flow through rotor 60.

A plurality of seals 168 keep foreign matter from entering bearing grooves 88 and 110. Ball bearing races 116 and 118 are hardened steel inserts in the preferred embodiment required for high speed rotation, together with hardened steel balls 72.

A plurality of fasteners 154 secure the housing covers 98 and 170 together, surrounding the frame 22 and attached hardware.

Input tube 40 is transparent in the preferred embodiment, and output tube 42 may be transparent as well with 42 being composed of a flexible material in the preferred embodiment. Bag 44 is preferably transparent but may be otherwise.

Preferably connecting rod 136 and frame 22 are composed of steel, aluminum or other elements of firm composition. Lever 204 is pivotally mounted in frame 22 as illustrated in FIGS. 20 and 21, and drive pully 68 may be secured to motor shaft 70 by a conventional key and set screw.

The weed remover of FIGS. 1—22 will perform a wide variety of weed removing and weed killing functions, including digging, removing, poisoning, collection, and dispersal, etc., but users will find it most useful for weed removal, weed collecting, and weed dispersal. For these functions users will find weed remover 14 most advantageous.

The weed remover 14 may be used much like a conventional shovel. The user places a foot on foot bar 34 and grips handles 16 with his or her hands. A wide variety of digging, twisting or probing motions may be first utilized and then, when appropriate, vacuum flow is initiated by trigger switch 22, and if so desired, weed killer may be dispensed by pressure upon trigger 18.

Targeted weeds and a small amount of associated dirt is sucked into tube 40. However, larger pieces of dirt or weeds will not enter end 96 of tube 90 because of the large diameter of tube 40 calibrated to vacuum intensities so that only lightweight bulky articles such as weeds or leaves are capable of entering tube 40.

Shoulder strap 46 may be utilized to carry weed remover 14 and is useful in positioning the weed remover when in operation.

Uprooted weeds are conveniently sucked into bag 44 and may be conveniently disposed of when desired. The weed remover 14 thereby provides, in a single tool, a convenient, efficient, and clean means by which a user can rapidly and thoroughly kill, collect, and dispense with weeds.

While the above description contains many specificities, the reader should not construe these as limitations on the scope of the invention, but merely as exemplifications of preferred embodiments thereof. Those skilled in the art will envision many other possible variations are within its scope. For example, skilled artisans will readily be able to change the dimensions and shapes of the various embodiments. They will be able to make the blade of different dimensions and materials. They can make many variations on the arrangement of collection tubes 40 and 92 and on the size and shape of collecting bag 44. Various type motors may be substituted for 28 and still be within the scope of the invention, as with handle 16, housing 170, and foot bar 34, for example. Accordingly, the reader is requested to determine the scope of the invention by the appended claims and their legal equivalents, and not by the examples which have been given.

I claim:

1. A weed removing apparatus for completely removing landscaping weeds without its user having to touch the soil or weeds, said apparatus comprising:
   a frame having a handle at one end and a digging blade at an opposing end,
   a foot bar extending from said frame,
   a means for generating a vacuum force through a vacuum input tube secured to said frame, and having vacuum blower means for depositing severed weeds into a weed collecting housing having a weed disposal bag therein,
   an outlet hose for discharge of air flow exhaust from said blower,
   means attached to said frame for storage and controlled release of weed killer or other fluid to the root area of said weed, and
   a strap attached to said frame for carrying and positioning the weed removing apparatus.

2. The weed removing apparatus of claim 1 wherein said means for generating a vacuum comprises a battery powered electric motor having a removable charger unit connected thereto.

3. The weed removing apparatus of claim 1 wherein said digging blade further includes a weed lifting hinge.

4. The weed removing apparatus of claim 1 wherein said weed disposal bag is comprised of disposable material.

5. The weed removing apparatus of claim 1 wherein said input tube is comprised of transparent material.

6. The weed removing apparatus of claim 1 wherein said outlet hose is comprised of transparent material.

7. The weed removing apparatus of claim 1 wherein said means for the storage and controlled release of weed killer or other fluid comprises a pinch valve assembly integrally linked to a tank for holding said weed killer and having tubing extending therefrom and terminating proximate to said digging blade.

8. A hand held weed removing apparatus for completely removing weeds without its user having to touch the soil or weeds, said apparatus comprising:
   a frame having handles at one end and a digging blade at an opposing end,
   a foot bar extending from said frame,
   means for generating a vacuum force through a vacuum input tube secured to said frame, and having vacuum blower means for depositing severed weeds into a weed collecting housing having a weed disposal bag therein,
   an outlet hose for discharge of air flow exhaust from said blower,
   means attached to said frame for storage and controlled release of weed killer or other fluid to the root area of said weed, and,
   a strap attached to said frame for carrying and positioning the weed removing apparatus.

9. The weed removing apparatus of claim 8 wherein said means for generating a vacuum comprises a battery powered electric motor having a removable charger unit connected thereto.

10. The weed removing apparatus of claim 8 wherein said digging blade further includes a weed lifting hinge.

11. The weed removing apparatus of claim 8 wherein said weed disposal bag is comprised of disposable material.

12. The weed removing apparatus of claim 8 wherein said input tube is comprised of transparent material.

13. The weed removing apparatus of claim 8 wherein said outlet hose is comprised of transparent material.

14. The weed removing apparatus of claim 8 wherein said means for the storage and controlled release of weed killer or other fluid comprises a pinch valve assembly integrally linked to a tank for holding said weed killer and having tubing extending therefrom and terminating proximate to said digging blade.

* * * * *